Jan. 2, 1968    J. ZEMANEK, JR    3,362,011
ACOUSTICALLY LOGGING COMPRESSIONAL AND SHEAR WAVE
AMPLITUDE RATIOS TO DETERMINE SUBSURFACE
FORMATION CHARACTERISTICS
Filed June 14, 1965    3 Sheets-Sheet 1
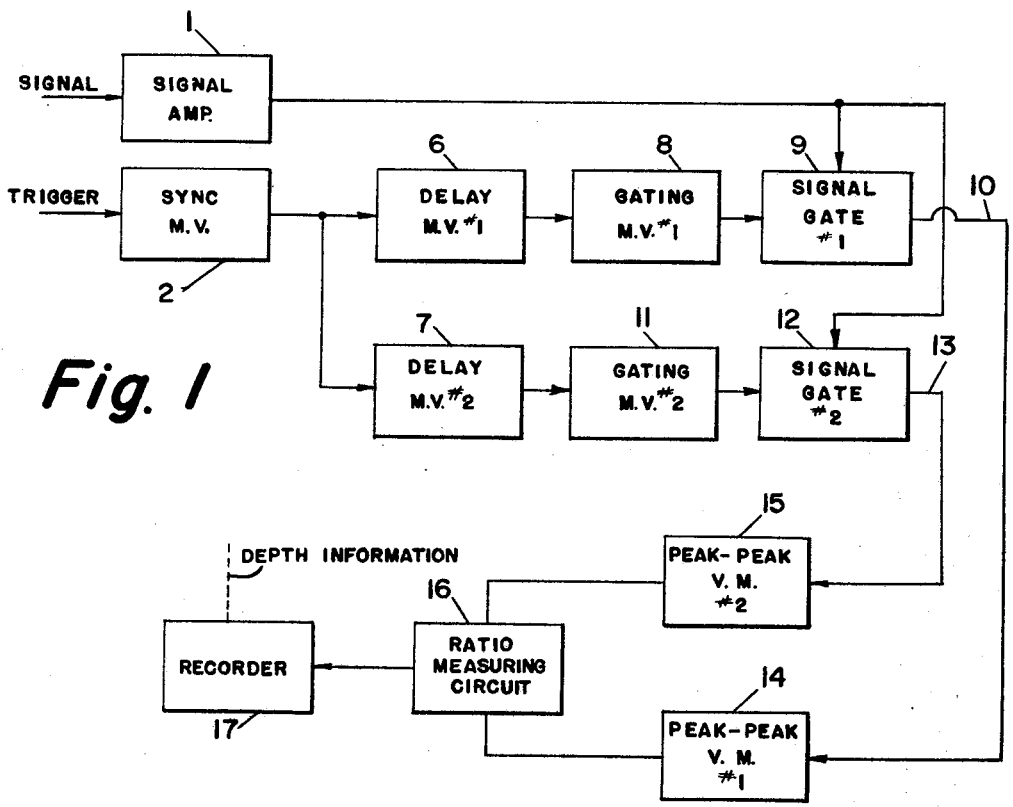
Fig. 1
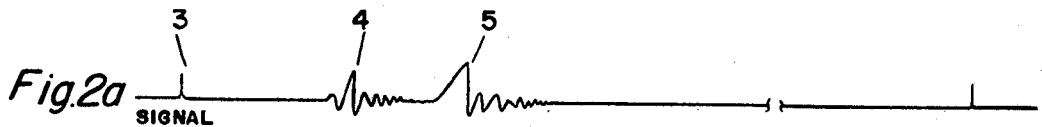
Fig.2a  SIGNAL
Fig.2b  SYNC M.V.
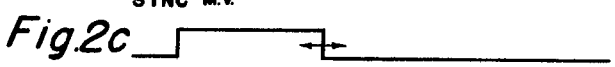
Fig.2c  DELAY M.V.#1
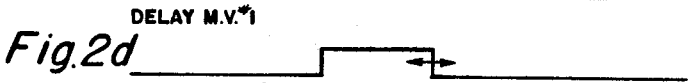
Fig.2d  GATING M.V.#1
Fig.2e  DELAY M.V.#2
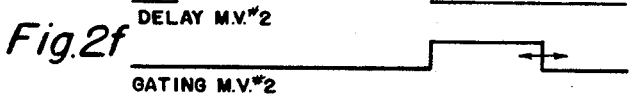
Fig.2f  GATING M.V.#2

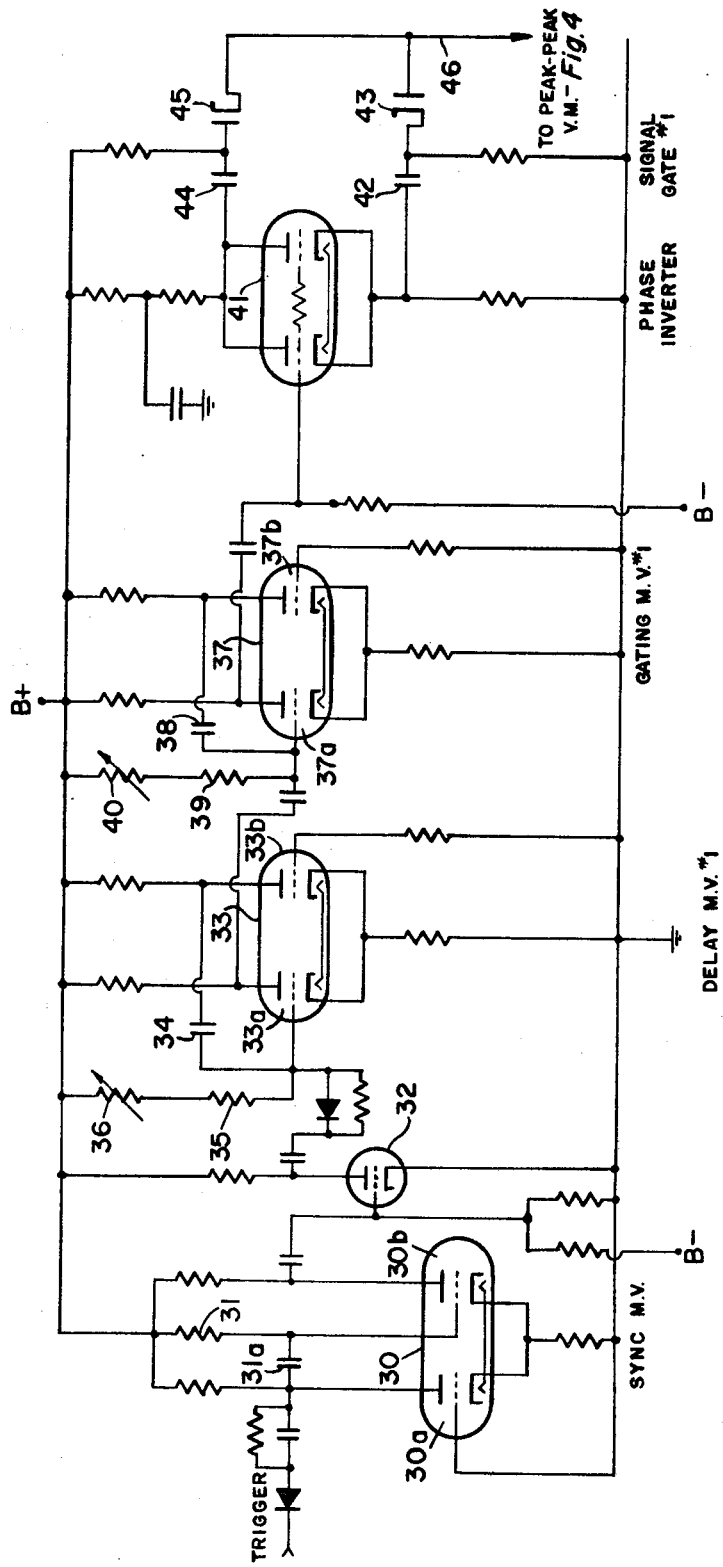

United States Patent Office 3,362,011
Patented Jan. 2, 1968

3,362,011
ACOUSTICALLY LOGGING COMPRESSIONAL AND SHEAR WAVE AMPLITUDE RATIOS TO DETERMINE SUBSURFACE FORMATION CHARACTERISTICS
Joseph Zemanek, Jr., Dallas, Tex., assignor to Mobil Oil Corporation, a corporation of New York
Filed June 14, 1965, Ser. No. 463,680
3 Claims. (Cl. 340—18)

ABSTRACT OF THE DISCLOSURE

This specification discloses an acoustical logging method and apparatus useful for determining the characteristics, e.g., permeability, of subsurface formations traversed by borehole. An acoustical pulse is transmitted and detected. The amplitudes of the detected compressional and shear wave components of the acoustical pulse are recorded and compared.

---

This invention relates to methods of and means for acoustic logging of boreholes and, more particularly, to determining the characteristics of subsurface formations adjacent a borehole by logging the ratio of the amplitudes of the compressional wave and the shear wave components of acoustic impulses which have travelled through the subsurface formations. In this application impulse is used as is pulse in the Summers Re. 24,446, column A, line 35 et seq.

Heretofore, acoustic impulses have been extensively used to determine the character of subsurface formations adjacent a borehole through which a source and a detector of acoustic impulses are concurrently moved. Generally, the character of the subsurface formations has been determined by measuring the velocity of the acoustic impulses through the formations. This measurement is made by logging the arrival time of the acoustic impulse at one or more detectors which are spaced from the source of acoustic impulses.

Although the measurement of acoustic velocity in a formation is generally a good indicator of the character of the formation, it has been found that the amplitude of the signal produced by the detection of the acoustic impulse is, in some cases, a better indicator of the character of the subsurface formations. However, the amplitude of the detected signal is a function of many variables in addition to the character of the subsurface formation through which the acoustic impulse travelled. For example, the amplitude of the detected signal is a function of the original amplitude of the acoustic impulse, the distance of travel through the formation, the frequency of the acoustic impulse and the sensitivity of the detector. A discussion of these and other complex phenomena of the propagation of acoustic impulses through a medium is discussed in "Theory of Propagation of Elastic Waves in a Fluid-Saturated Porous Solid," The Journal of the Acoustic Society of America, vol. 28, No. 2, March 1956, pages 168–191.

One of the properties of an acoustic impulse travelling through a medium is that it has at least two components. A first of these components is generally referred to as the compressional wave and a second of these components is generally referred to as the shear wave. The compressional wave component of the acoustic impulse has a higher velocity through the medium than does the shear wave component. Therefore, each detected signal includes a first arriving compressional wave component and a later arriving shear wave component. Furthermore, the attenuation of these two components as they travel through the medium differs in accordance with the varying characteristics of the medium because the compressional wave is affected by the permeability of the medium, whereas the shear wave is not affected by the permeability of the medium. Therefore, the ratio of the amplitude of the compression wave and the shear wave provides a good indication of the permeability of the medium.

In accordance with one aspect of this invention, a determination of the character and nature of the subsurface formations adjacent a borehole is obtained by logging the ratio of the amplitudes of the first arriving compressional wave and the later arriving shear wave.

In acordance with another aspect of this invention, there is provided circuitry for separating the compressional wave component from the shear wave component of the detected signal so that the ratio of the amplitude of these two components may be obtained.

The foregoing and other objects, features and advantages of the invention will be better understood from the following more detailed description and appended claims in conjunction with the drawings in which:

FIG. 1 shows a block diagram of the circuitry for separating the shear wave from the compressional wave and measuring the ratio of the amplitudes of the two;

FIGS. 2a–2f are waveforms depicting the operation of the system;

FIG. 3 shows a portion of the circuitry of the block diagram of FIG. 1; and

Figure 4:
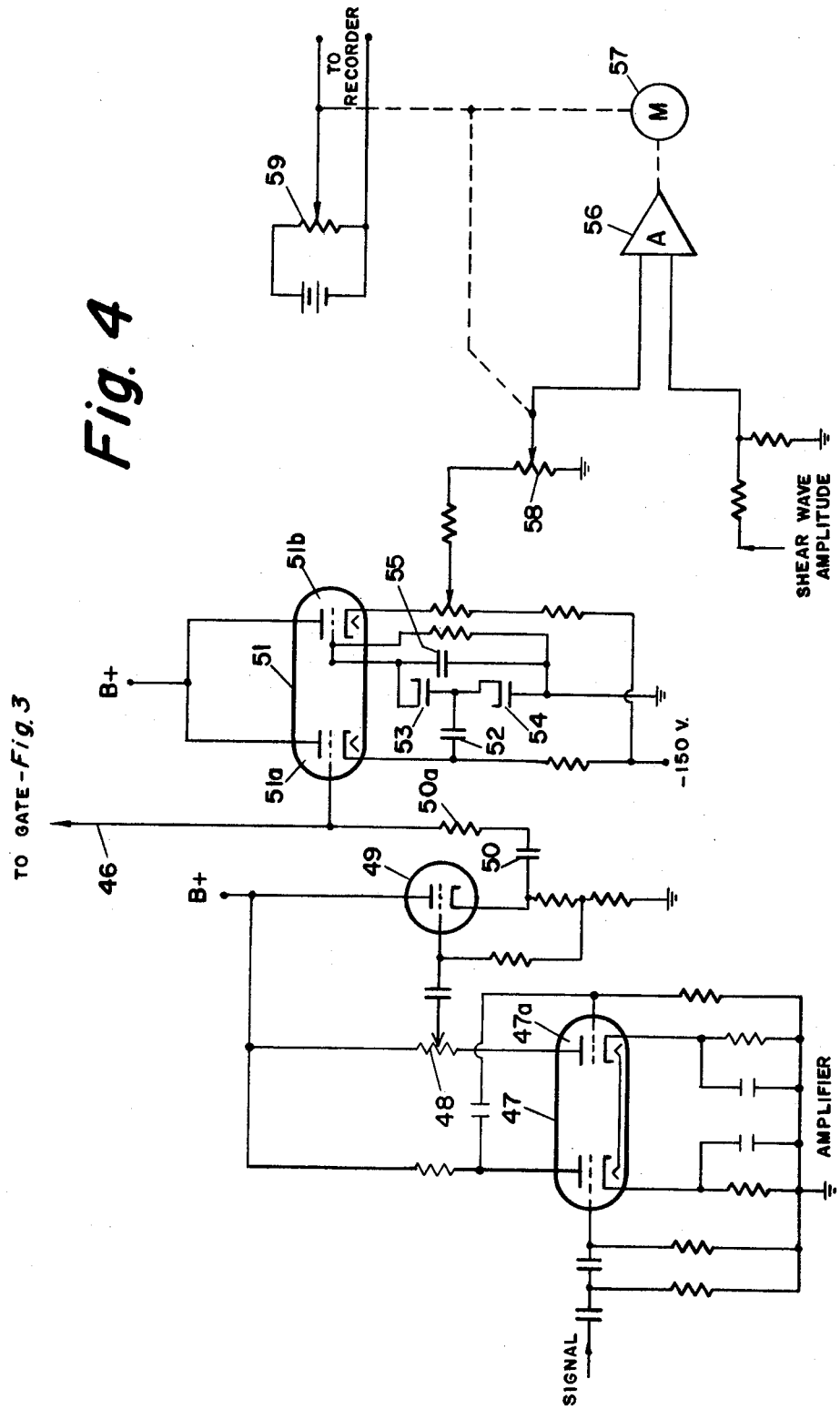
FIG. 4 shows another portion of the circuitry of the block diagram of FIG. 1.

Many acoustic logging tools are suitable for use in accordance with this invention. One such logging tool is shown in the Summers Re. 24,446. In that patent there is described the manner in which a source of acoustic impulses and a detector of acoustic impulses are positioned in a logging tool which is moved through a borehole. Each acoustic impulse from the source travels through the subsurface formation adjacent the borehole and is detected by a detector which produces a signal which is transmitted uphole. The pulses which energize the acoustic source are also connected uphole. Hereafter, these pulses will be referred to as the trigger pulses and the output of the detector will be referred to as the signal.

Referring now to FIG. 1, the signal from the detector in the logging tool is applied to an uphole signal amplifier 1 and the trigger pulses, which energize the acoustic source, are applied to a sync multivibrator 2. Sync multivibrator 2 controls gating circuitry which separates the signal into two components, each of which appears at a different output of the gating circuitry.

The nature of the signal which is to be separated into its two components can be better understood with reference to the waveform of FIG. 2a. This shows the signal which is the output of the downhole detector. The signal includes a sharp spike 3 which occurs coincidentally with the production of the acoustic impulse by the source. The acoustic impulse also travels by way of the adjacent formations and is later detected by the detector. As previously described, this detected signal includes a first arriving compressional wave component 4 and a later arriving shear wave component 5. One technque of logging the shear wave component of a received signal is more fully described in an application entitled Shear Wave Acoustic Logging, filed by a coemployee, Richard L. Caldwell, on June 14, 1965, and having Ser. No. 463,671, now Patent No. 3,333,238. The aforementioned application discloses methods and means of detecting the shear wave while logging through formations of changing velocity characteristics.

The circuitry shown in block form in FIG. 1 is provided to separate these two components so that the ratio of their amplitudes may be taken.

Referring again to FIG. 1, the trigger pulse switches the sync multivibrator 2 to its quasi-stable condition as indicated in FIG. 2b. Sync multivibrator 2 remains in its quasi-stable condition throughout the time period encompassing the expected arrival of the detected signal and returns to its stable state shortly before the occurrence of the next trigger pulse. The purpose of sync multivibrator 2 is to insure that the gating operations are initiated only once upon the occurrence of the trigger pulse and are not initiated by extraneous noise during the time period between trigger pulses.

The output of sync multivibrator 2 is applied to delay multivibrator #1, indicated by reference numeral 6, and to delay multivibrator #2, indicated by reference numeral 7. Both delay multivibrators are switched to their quasi-stable states concurrently with the trigger pulse as indicated in FIGS. 2c and 2e. Delay multivibrator #1 returns to its stable state prior to the expected time of arrival of the compressional wave component. The time at which delay multivibrator #1 returns to its stable state is adjustable so that this will always precede the arrival of the compressional wave component. The output of delay multivibrator #1 is applied to gating multivibrator #1, indicated by the reference numeral 8. Gating multivibrator #1 generates a gating voltage which encompasses the expected interval during which the compressional wave component arrives. Gating multivibrator #1 returns to its stable state prior to the arrival of the shear wave component. The output of gating multivibrator #1 is applied to a signal gate #1, indicated by reference numeral 9, so that this signal gate passes the compressional wave component of the signal to the first output of the gating circuitry, indicated at 10.

The shear wave component is conveyed to a second output by similar circuitry. Delay multivibrator #2 returns to its stable condition at a time prior to the expected arrival of the shear wave component. The output of delay multivibrator #2 is applied to gating multivibrator #2, indicated by reference numeral 11. Gating multivibrator #2 generates a gating voltage which encompasses the time interval during which the arrival of the shear wave component is expected. The output of gating multivibrator #2 is applied to a signal gate #2, indicated at 12. This signal gate passes the shear wave component of the signal to the second output 13 of the gating circuitry.

The compressional wave component on output 10 is applied to a peak-to-peak voltage measuring circuit #1, indicated as reference numeral 14, which produces an output proportional to the amplitude of the compressional wave. Similarly, the shear wave components on output 13 is applied to a peak-to-peak voltage measuring circuit #2, indicated at 15, which produces an output proportional to the amplitude of the shear wave. The outputs of peak-to-peak voltage measuring circuits 14 and 15 are applied to a ratio measuring circuit 16 which produces an output proportional to the ratio of the amplitude of the compressional wave to the amplitude of the shear wave.

The output of ratio measuring circuit 16 is recorded as a function of depth of the logging tool in the borehole by the recorder 17. The recorder 17 is driven in correlation with the movement of the logging tool through the borehole. This is shown in the aforementioned Summers Patent Re. 24,446 by the mechanical connection 36 between the recorder 35 and the sheave 37 over which the cable which moves the logging tool through the borehole passes.

Briefly summarizing the operation of the system, a trigger pulse actuates an acoustic source in a downhole logging instrument. The source produces an acoustic impulse which travels through the subsurface formation adjacent the borehole and is detected by a detector spaced from the source. The acoustic impulse has a relatively high velocity compressional wave component and a lower velocity shear wave component. The detected signal includes the compressional wave component 4 and the shear wave component 5. This signal is coupled uphole to a signal amplifier 1, the output of which is applied to signal gates 9 and 12.

The trigger pulses are applied to sync multivibrator 2, the output of which is applied through delay multivibrators 6 and 7 to gating multivibrators 8 and 11. Gating multivibrator 8 produces a gating voltage which encompasses the expected time of arrival of the compressional wave component and gating multivibrator 11 produces a gating voltage encompassing the expected time of arrival of the shear wave component. These gating voltages are applied to signal gates 9 and 12 so that the compressional wave component appears on the output 10 of the gating circuitry and the shear wave component appears on the output 13 of the gating circuitry. The amplitudes of the compressional and shear waves are respectively measured in the peak-to-peak voltage measuring circuits 14 and 15. Voltages proportional to the amplitudes of the compressional and shear waves are applied to the ratio measuring circuit 16 which produces an output which is recorded as a function of depth of the logging tool in the borehole. This log of the ratio of the amplitudes is indicative of the nature and character of the subsurface formations through which the acoustic impulses travelled.

There will now be described the circuitry making up the system shown in block form in FIG. 1. The circuitry making up delay multivibrator #2, gating multivibrator #2 and signal gate #2 has not been shown but it will be appreciated that it will correspond with the circuitry making up delay multivibrator #1, gating multivibrator #1 and signal gate #1 which is shown in detail.

The circuit details of the gates and multivibrators are similar to those in my copending application entitled Logging Scale Signals, Ser. No. 434,396, now abandoned, filed on Feb. 23, 1965.

Referring to FIG. 3, trigger pulses are applied to the sync multivibrator which includes the double triode 30. The two stages of double triode 30 are interconnected so that the stage 30a is normally non-conducting and the stage 30b is normally conducting. Upon the occurrence of a negative-going trigger pulse which is coupled to the grid of stage 30b, stage 30b will be rendered non-conducting. Because of coupling between stage 30a and stage 30b by means of the common cathode and capacitor 31a, the stage 30a conducts. When the two stages of the multivibrator are in these conducting conditions, the multivibrator is said to be in a quasi-stable state. It will remain in the quasi-stable state for a time period determined by the time constant of a resistor-capacitor network including resistor 31 and capacitor 31a.

When the sync multivibrator is switched to its quasi-stable state, a positive-going waveform is produced at the plate of stage 30b. This positive-going waveform is coupled by means of shaping amplifier 32 to delay multivibrator #1 which includes the double triode 33. The operation of this, and subsequently mentioned multivibrators, is similar to that just described for the sync multivibrator. The negative-going voltage at the grid of stage 33a turns this stage off and, concurrently, stage 33b is turned on. The time that delay multivibrator #1 remains in its quasi-stable state is determined by the time constant of a circuit including capacitor 34, resistor 35 and variable resistor 36. By adjusting the variable resistor 36, the time during which the delay multivibrator #1 remains in its quasi-stable condition can be adjusted so that the leading edge of the voltage produced by the subsequent gating multivibrator always occurs just prior to the occurrence of the compressional wave.

The voltage at the plate of stage 33a, which is a positive-going voltage, is applied to the gating multivibrator #1 which includes the double triode 37. Gating multivibrator #1 is switched to its quasi-stable state by the trailing edge of the positive-going voltage applied to the grid of stage 37a. The gating multivibrator #1 remains in this quasi-stable condition for a time period determined by the time constant of a circuit, including capacitor 38, resistor 39 and variable resistor 40, which can be adjusted to vary the time that the gating multivibrator #1 remains in its quasi-stable state.

The positive-going voltage from gating multivibrator #1 is applied to the phase inverter including the double triode 41. This double triode is connected so that a positive-going voltage appears at the common connected cathodes thereof and a negative-going voltage appears at the common connected plates thereof.

The positive-going voltage at the common cathodes is coupled through capacitor 42 to the cathode of one of the gate diodes 43. When the voltage at the cathodes of double triode 41 is positive, the diode 43 will be back-biased. However, at other times, the diode 43 will be forward-biased thereby preventing a signal from passing to the peak-to-peak voltage measuring circuit as will be subsequently described.

The voltage at the plates of double triode 41 is coupled through capacitor 44 to the anode of the other diode 45 in the gate. When the voltage at the anodes of double triode 41 is negative-going, the diode 45 will be back-biased but otherwise the diode will be forward-biased, thereby preventing signals from reaching the peak-to-peak voltage measuring circuit. The output of the gate on conductor 46 is coupled to the circuitry of FIG. 4 to determine whether or not the signal passes to the peak-to-peak voltage measuring circuit.

Referring now to FIG. 4, the signal from the downhole detector is coupled to the uphole amplifier including the double triode 47. The plate of the stage 47a of this amplifier is connected to a gain-changing potentiometer 48. The desired amplitude signal can be selected by moving the movable contact of potentiometer 48. The signal appearing on the movable contact is applied to the grid of cathode follower 49. The cathode of cathode follower 49 is coupled through capacitor 50 and resistor 50a to the peak-to-peak voltage measuring circuit which includes double triode 51. This same input to the peak-to-peak voltage measuring circuit is connected to the conductor 46 which leads to the gate of FIG. 3. When the diodes of the gate are back-biased, a signal is developed at the grid of stage 51a. However, when the diodes of the gate are forward-biased, no signal is applied to the peak-to-peak voltage measuring circuit. Therefore, a signal is applied to the grid of stage 51a only during the time interval of the expected arrival of the compressional wave.

The signal, which appears at the cathode of stage 51a, is coupled through capacitor 52 to the back-to-back diodes 53 and 54. The positive component of the signal passes through diode 53 and the negative component passes through diode 54. The result is that the capacitor 55 is charged to a voltage proportional to the peak-to-peak magnitude of the compressional wave component. The voltage on capacitor 55 is coupled through the cathode follower stage 51b to one input of the ratio circuit.

The ratio circuit comprises a self-balancing circuit including a DC amplifier 56, a motor 57, and potentiometers 58 and 59, the movable contacts of which are driven by the motor. The voltage which is proportional to the amplitude of the compressional wave, taken from the cathode resistor of stage 51b, is applied across potentiometer 58. A portion of this compressional wave signal is picked off by the movable contact of potentiometer 58 and applied as one input to amplifier 56.

The shear wave signal is applied to the other input to amplifier 56. The output of amplifier 56 drives the motor 57 which is mechanically coupled to the movable contact of potentiometer 58. Motor 57 moves the movable contact of potentiometer 58 to a position which balances the two input voltages to amplifier 56. The motor 57 also drives the movable contact of potentiometer 59 which has a source of voltage connected across it. The motor 57 moves the movable contact of potentiometer 59 to a position such that the voltage on the movable contact is proportional to the ratio of the shear wave signal to the compressional wave signal. This voltage is applied to a recorder which records the ratio voltage as a function of the depth of the logging tool in the borehole.

In the above description, it has been assumed that the gating circuitry was opened and closed at a predetermined time after the trigger pulses. The above-described gating circuitry is manually adjustable so that the compressional wave and the shear wave are separated from the received signals. It will be appreciated that the opening and closing of the gates can be made automatically adjustable so that the gates will always pass the desired component of the receiver signal. For example, in my copending application Ser. No. 221,504, filed Sept. 5, 1962, now Patent No. 3,259,880, there is disclosed circuitry for adjusting the opening and closing times of the gates automatically.

While a particular embodiment of this invention has been shown and described, it will, of course, be understood that various changes may be made without departing from the principles of the invention. The appended claims are, therefore, intended to cover any such modifications within the true spirit and scope of the invention.

What is claimed is:

1. In acoustic well logging wherein repetitive acoustic impulses from a source are each detected at a detector which is moved through a borehole in fixed spaced relationship with said source to produce electrical signals having a first portion representative of a first arriving compressional wave component and a second portion representative of a later arriving shear wave component of said impulses, the method of determining a characteristic of the subsurface formations adjacent said borehole comprising:

separating said first portion of said electrical signals representative of said first arriving compressional wave component from the detected signal, separating said second portion of said electrical signals representative of said later arriving shear wave component from the detected signal, dividing said first and second portions of said electrical signals one by the other for producing ratio signals, and recording said ratio signals in correlation with depth to provide said information as to a characteristic of said formations along said borehole.

2. The method of measuring the permeability of earth formations penetrated by a borehole which comprises:

repetitively generating acoustic impulses at different depths of the borehole for producing through the earth formations adjacent to said borehole earth movements having a compressional wave component and a shear wave component, detecting said compressional and said shear wave components to produce electrical signals representative of said compressional and said shear wave components, the ratio of said electrical signals representative of said compressional wave and said shear wave components varying in amplitude in proportion to the permeability of said earth formations along the travel path of said acoustic impulses, dividing said electrical signals representative of said components one by the other for producing a ratio signal, and recording said ratio signal in correlation with depth to provide said information as to the permeability of said formations along said borehole.

3. In acoustic well logging wherein acoustic impulses from a source travel through subsurface formations adjacent a borehole and produce in a detector spaced from said source a signal including an early arrival indicative of the compressional wave of said acoustic impulse and a later arrival indicative of the shear wave of said acoustic impulse, the method of determining the characteristics of the subsurface formations adjacent said borehole comprising:
    moving said source and said detector in fixed predetermined relationship through said borehole,
    coupling each detected signal to an uphole location,
    generating in response to each acoustic impulse a first gating waveform encompassing the expected time of arrival of said compressional wave and a second gating waveform encompassing the expected time of arrival of said shear wave,
    applying said signal and said first and second gating waveforms to circuitry which separates said compressional wave from said shear wave and preserves the relative amplitudes of said compressional and said shear waves,
    dividing the amplitude of said compressional wave and the amplitude of said shear wave one with the other to obtain the ratio of the two amplitudes, and
    recording said ratio signals as a function of the depth of said source and detector in said borehole to obtain a log of the characteristics of the subsurface formation as a function of depth.

References Cited

UNITED STATES PATENTS

| | | | |
|---|---|---|---|
| 2,233,992 | 3/1941 | Wyckoff | 340—18 X |
| 2,943,694 | 7/1960 | Goodman | 181—.5 |
| 3,003,577 | 10/1961 | Itria | 181—.5 |
| 3,208,549 | 9/1965 | Alexander et al. | 340—18 X |
| 3,252,131 | 5/1966 | Vogel | 340—18 |

OTHER REFERENCES

Pickett: Acoustic Character Logs and Their Applications in Formation Evaluation, Journal of Petroleum Technology, June 1963, pp. 659–667.

BENJAMIN A. BORCHELT, *Primary Examiner.*

SAMUEL FEINBERG, *Examiner.*

R. M. SKOLNIK, *Assistant Examiner.*